Nov. 3, 1970   SEIGO MATSUDA ET AL   3,537,904
MEANS FOR PREVENTING INTERNAL CURRENTS IN A FUEL CELL
Filed Dec. 4, 1967   2 Sheets-Sheet 1

INVENTOR.
SEIGO MATSUDA
BY John M. Brandt
AGENT

United States Patent Office 3,537,904
Patented Nov. 3, 1970

3,537,904
MEANS FOR PREVENTING INTERNAL CURRENTS IN A FUEL CELL
Seigo Matsuda, Wayland, and Bernard P. Sullivan, Somerville, Mass., assignors to Monsanto Research Corporation, St. Louis, Mo., a corporation of Delaware
Filed Dec. 4, 1967, Ser. No. 694,764
Int. Cl. H01m 27/12
U.S. Cl. 136—86                      1 Claim

ABSTRACT OF THE DISCLOSURE

Apparatus is disclosed for interrupting the electrolyte path from a common electrolyte tank to individual cells within a fuel cell stack. Interruption of the electrolyte path greatly reduces or eliminates internal currents by breaking the conducting path between the cells. Specifically, means are provided to create one or more gas bubbles in the electrolyte by methods such as electrolytic decomposition of the electrolyte.

BACKGROUND OF THE INVENTION

Field of the invention

By a fuel cell is meant a device for electrochemical generation of electricity which is provided with a continuous supply of chemicals, the reaction of which produces a potential difference across the cell. Means are included to remove the products of the reaction. In contrast, a flashlight battery, for example, lasts no longer than its self-contained supply of the electrochemical reagents. An automobile battery depends on frequent charging by a mechanical generator for prolonging its life. The theory upon which the fuel cell is based provides that the cell will continue to deliver electricity for so long as the reactants are supplied to the cell and reaction products removed so as to maintain a substantially invariant system.

Voltage and current requirements of devices operated by fuel cells are such that a number of cells are ordinarily combined in a stack to overcome the output capacity limitations of a single cell. When a plurality of cells are so arranged, means must be provided to feed reactants and electrolyte to each cell simultaneously. Most convenient methods are such that a common electrolyte supply creates in one way or another, a conductive path between the cells.

The potential of each cell varies slightly due to physical parameters, chemical purity of components and reactants, and the like. Therefore, a certain amount of internal current will flow between cells consuming fuel and oxidant even when no external load is connected across the stack. The overall result is a lower efficiency for an operating stack and more importantly a continued usage and drain of reactant supply for a non-operating stock.

The overall efficiency of fuel cell stacks accounts for fuel and oxidant consumption in both the operating and non-operating states. It will be appreciated therefore, that a substantial decrease in overall efficiency will be experienced if the reactants are slowly but steadily consumed when the stack is in a non-operating mode due to a conductive path of common electrolyte.

Description of the prior art

The method usually employed the reduce currents in common electrolyte involves the use of long thin supply tubes from the supply tank to each cell. Resistance is proportional to length and inversely proportional to area. A relatively long, thin electrolyte supply tube will present a much greater impedance to internal currents than a shorter tube of larger diameter. This expedient imposes structural limitations on fuel cell design and in addition only reduces the magnitude of the problem since a conductive path of increased resistance still exists.

SUMMARY

It has now been discovered that the internal currents which inhibit the performance of fuel cells as described above may be significantly reduced by introducing one or more gas bubbles into the path connecting a common electrolyte tank or supply and individual cells within the stack. The gas bubbles form an almost perfect resistance to internal currents and new bubbles may be continually generated as their predecessors are swept away by electrolyte flow into the cells or as they shift position due to buoyancy or physical movement of the apparatus.

DESCRIPTION OF THE PREFERRED EMBODIMENTS

Figure 1:
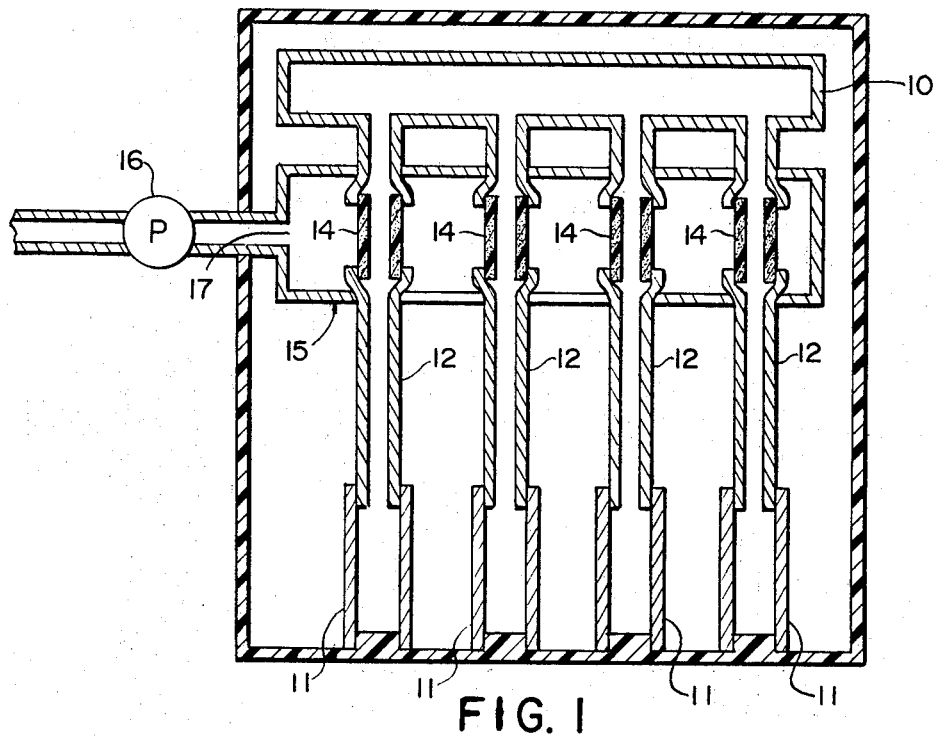
FIG. 1 is a schematic drawing of one embodiment of the invention.

Referring to FIG. 1, there is shown in schematic representation a fuel cell stack employing an embodiment of the present invention. The stack is supplied by common electrolyte tank 10 which supplies individual cells 11 through conduits 12. Each conduit is comprised in part of a gas permeable material which may be tube 14 inserted in a portion of the conduit. Where desired the material may form the entire conduit if the structural design of the stack permits.

A pressure chamber 15 surrounds the entire bank of conduits and includes the gas permeable section of each. Pump 16 at chamber entrance 17 is used to maintain a pressure higher than the hydraulic pressure of the electrolyte within the conduit. The pump may be driven by an electric motor (not shown) which derives its power from the cell itself. Means can be included which regulate the flow rate and pressure developed by the pump which will in turn control the rate at which bubbles are introduced into the conduit. For example, the speed of the pump driving motor may be adjustable or the mechanical parameters of the system such as the size of entrance port 17 can be varied.

In operation, pressure is developed in chamber 15 which forces gas bubbles into the conduits in the region of the gas permeable insert. As will be recognized the bubbles form a highly resistive gap which impedes the flow of internal currents.

The gas permeable insert may be advantageously constructed of a non-wetting material, to provide the ability to transmit gas or vapor to the interior of the conduit while completely preventing any electrolyte leakage to the exterior of the conduit. The contact angle between such non-wetting material and the liquids contacting it in the cell will preferably be at least 45°, and preferably higher. Particularly suitable non-wetting materials include, for example, highly fluorinated polymers such as polytetrafluoroethylene, perfluoroethylene - perfluoropropylene copolymers, poly(chlorotrifluoroethylene), polyheptafluorobutyl acrylate, vinylidene fluoride-perfluoropropylene copolymers, polyperfluoropropyltriazines, trifluoronitrosomethane-tetrafluoroethylene copolymers, fluorinated polyethylene, and the like. Hydrocarbon polymers such as polyethylene and polypropylene may also be used. The porosity of the above materials may be controlled for example, by molding techniques which are well known in the art.

Figure 2A:
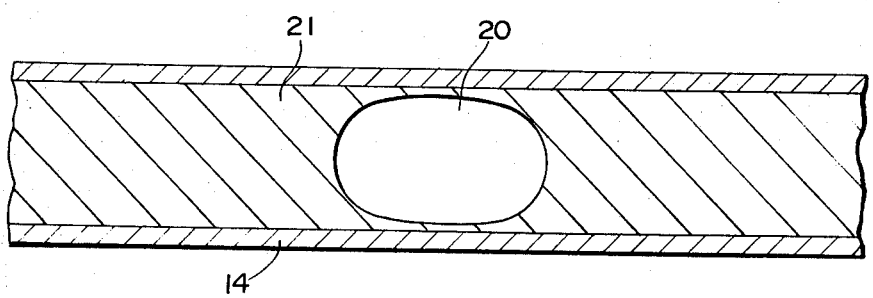
FIGS. 2a and 2b are schematic drawings of the effects resulting from the use of different types of conduit material in the invention.
Figure 2B:
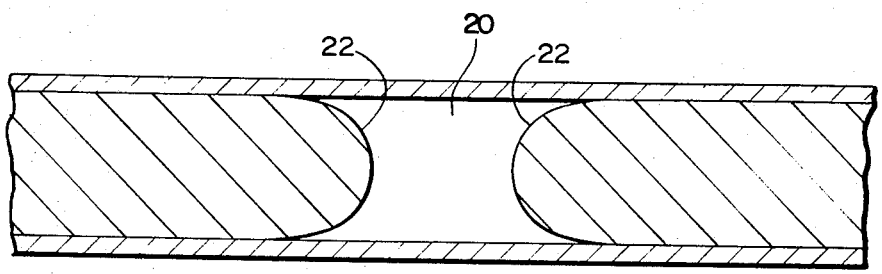

Referring to FIGS. 2a and 2b there is shown the effect of using a non-wetting material for gas permeable insert 14. FIG. 2a shows the shape of gas bubble 20 developed in a conduit which has an affinity for electrolyte solution 21. It will be seen that a very small electrolyte path may still exist around the edge of the bubble. This path is much less conductive than that that would be present in a fuel cell which does not incorporate the present invention. But as seen in FIG. 2b, the isolation of the tank and the individual cells may be made complete by employing a non-wetting, or in the case of water solvent electrolyte cells, hydrophobic material as gas permeable member 14. The shape of the bubble 20 now comprises a pair of inverted miniscusses 22 since the electrolyte fluid is repelled by the non-wetting surface of the conduit insert.

Figure 3:
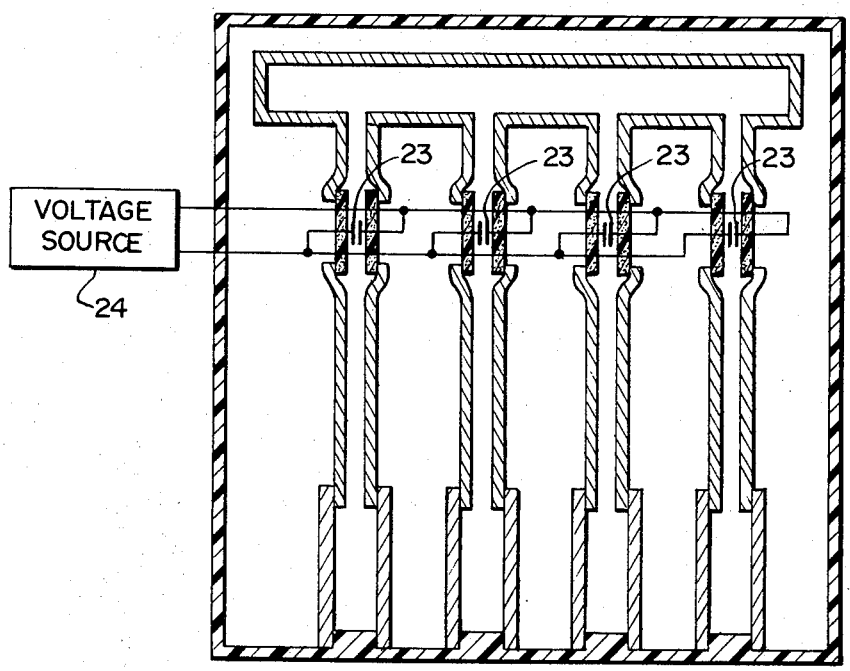
FIG. 3 is a schematic drawing of a second embodiment of the invention.

Referring to FIG. 3, another embodiment of the present invention is illustrated employing electrolytic decomposition of the electrolyte.

As in the previous embodiment, a stack with a plurality of conduits connecting the common electrolyte tank and the individual cells is shown. A pair of electrodes 23 are implanted in each conduit which again may be either wetting or non-wetting but preferably non-wetting as discussed above. However, in this embodiment it is not necessary that the conduit material be vapor permeable.

Power for the electrodes as illustrated by voltage source 24 may be drawn from the stack itself or from an auxiliary source such as a small flashlight battery. The electrodes may be arranged to draw power alternatively from the auxiliary source or the stack when connected to a load. The rate of electrolysis and thus the rate of bubbling within the conduit can be adjusted according to the electrolyte solvent employed and according to the environment of the cell which will determine the frequency with which the bubbles are dislodged and require replacement. Means can be included within the stack to vent the product gas which may accumulate at the top of the electrolyte tank.

An alternative cell construction may include either a fuel or oxidant dissolved in the electrolyte solution creating what is often termed an anolyte or a catholyte. The present invention is entirely applicable to a cell system of this type and inclusion of one of these reactants may greatly reduce the potential required across the electrodes to produce a resultant gas. For example, when a fuel such as hydrazine is mixed with a potassium hydroxide electrolyte some nitrogen and hydrogen is released spontaneously as a local reaction at the anode even at open circuit. Although this local reaction is insufficient to provide enough gas to interrupt the path, it has been found that no more than a few tenths of a volt across the electrodes are necessary to carry out the purpose of this invention.

Since certain changes may be made in the above process and apparatus without departing from the scope of the invention herein involved, it is intended that all matter contained in the above description and shown in the accompanying drawings shall be interpreted as illustrative and not in a limiting sense.

What is claimed is:
1. A fuel cell comprising:
 (a) a fuel cell stack having a plurality of individual cells supplied by a common liquid electrolyte, and
 (b) apparatus for reducing the internal current between said cells and in said electrolyte comprising
  (1) an electrolyte tank,
  (2) a plurality of conduit means connecting said tank with said cells, said conduit means providing an electrolyte path; and
  (3) means for introducing at least one gas bubble into each of said conduit means for interrupting said electrolyte path wherein a portion of each of said conduit means comprises a hydrophobic vapor permeable material and wherein said means for introducing a gas bubble into said conduit means comprises a chamber surrounding said conduit means, and means to create within said chamber an internal pressure higher than the hydrostatic pressure of said electrolyte.

References Cited

UNITED STATES PATENTS

| | | | |
|---|---|---|---|
| 1,781,005 | 11/1930 | Gill | 136—162.05 |
| 1,807,595 | 6/1931 | Kershaw | 136—134 |
| 2,635,431 | 4/1953 | Bichowsky | 136—86 |
| 3,235,407 | 2/1966 | Nicholson et al. | 136—86 |
| 3,340,095 | 9/1967 | Fitton | 136—86 |
| 3,331,704 | 7/1967 | Vickers et al. | 136—86 |

FOREIGN PATENTS

| | | |
|---|---|---|
| 14,726 | 7/1898 | Great Britain. |
| 198,274 | 5/1923 | Great Britain. |
| 1,085,899 | 10/1967 | Great Britain. |

WINSTON A. DOUGLAS, Primary Examiner

M. J. ANDREWS, Assistant Examiner